(No Model.)
E. V. GAUTHIER.
SPROCKET WHEEL.
No. 591,270. Patented Oct. 5, 1897.
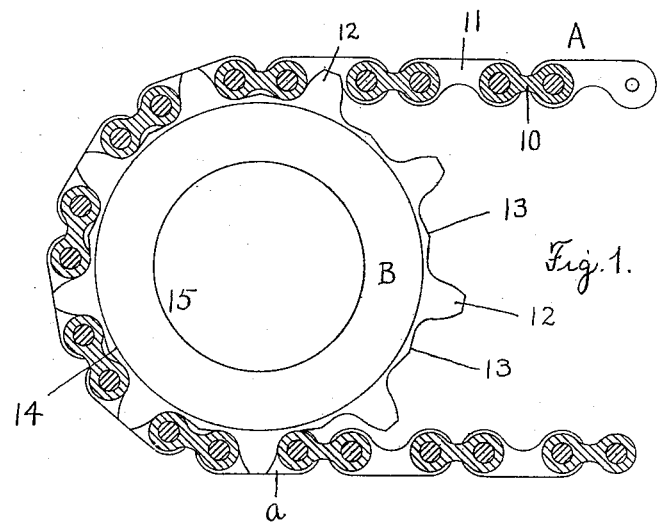
Fig. 1.
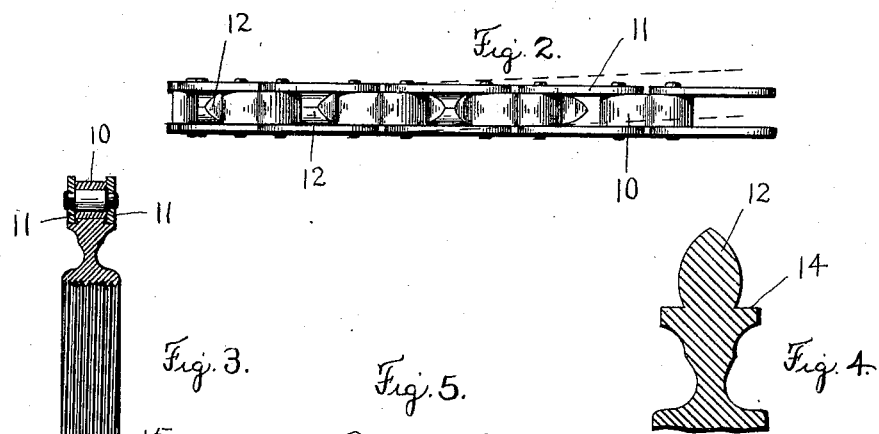
Fig. 2.
Fig. 3.    Fig. 4.
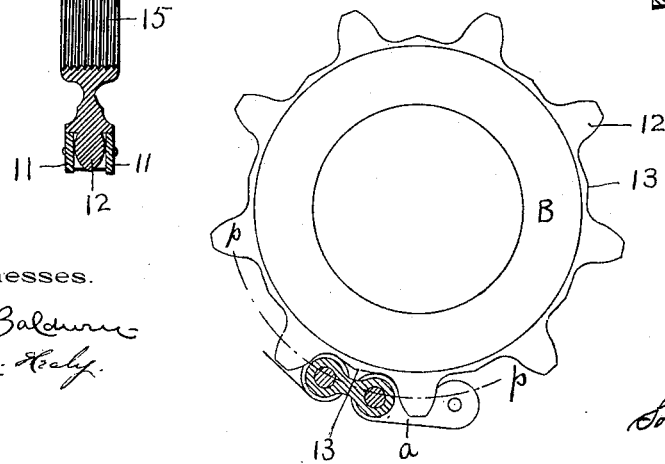
Fig. 5.
Witnesses.
W. J. Baldwin
E. M. Healy
Inventor.
E. V. Gauthier
By
Southgate & Southgate
Attorneys.

UNITED STATES PATENT OFFICE.

ERNEST V. GAUTHIER, OF WESTBOROUGH, MASSACHUSETTS.

SPROCKET-WHEEL.

SPECIFICATION forming part of Letters Patent No. 591,270, dated October 5, 1897.

Application filed August 2, 1897. Serial No. 646,783. (No model.)

*To all whom it may concern:*

Be it known that I, ERNEST V. GAUTHIER, a citizen of the United States, residing at Westborough, in the county of Worcester and State of Massachusetts, have invented a new and useful Improvement in Sprocket-Wheels, of which the following is a specification.

The object of my invention is to provide a bicycle sprocket-wheel having flanges for engaging the side links of a sprocket-chain, and teeth which are narrow or undercut at their bases, so as to hold the side links away from the supporting-surfaces which coöperate with the blocks of the chain.

To these ends my invention consists of the sprocket-wheel and the combination thereof with a sprocket-chain, as hereinafter described, and more particularly pointed out in the claims at the end of this specification.

In the accompanying drawings, Figure 1 is a side view of a sprocket-wheel constructed according to my invention, a sprocket-chain coöperating therewith being shown in section. Fig. 2 is a plan view of the same. Fig. 3 is a transverse sectional view. Fig. 4 is an enlarged sectional view illustrating the shape of the sprocket-teeth; and Fig. 5 is a side view of a sprocket-wheel to be hereinafter referred to, part of a sprocket-chain coöperating therewith being shown in section.

The standard sprocket-chain ordinarily employed for bicycles comprises a series of blocks and side links, the side links being pivotally connected to the blocks by means of rivets.

The ordinary sprocket-wheel is provided with extending teeth fitting into the spaces between the blocks of the sprocket-chain.

In the common forms of bicycle construction the width of the face of the sprocket-wheel corresponds with the width of the blocks and the side links are left unsupported.

To maintain a correct working relation between a sprocket-wheel and its chain, it is essential that the chain should fit onto the sprocket-wheel so as to bring its rivets exactly onto the pitch-line thereof.

In the ordinary form of bicycle construction whenever the working faces of the sprocket-wheel and the blocks of the sprocket-chain become worn the blocks will seat themselves more deeply into the sprocket-wheel and the chain will pass onto the sprocket-wheel so that its rivets will no longer correspond accurately with the pitch-line.

In order to increase the width of the wearing-surfaces of a sprocket wheel and chain, it is desirable to provide the sprocket-wheel with supporting-surfaces for coöperating with the side links of the chain as well as with the blocks thereof.

The especial object of my invention is, therefore, to provide a sprocket-wheel with extending flanges for coöperating with the side links of a sprocket-chain and to shape or cut the teeth so that the side links will be held away from the supporting-surfaces which engage the blocks of the chain.

In practice I have found that a straight-toothed sprocket-wheel or a sprocket-wheel having tapering teeth of greatest width at their bases cannot be provided with flanges for coöperating with the side links of the chain so as to produce the best results, as in such constructions the side links catch onto or run up onto the supporting-surfaces between the teeth which should normally engage the blocks. This defect in operation is especially noticeable when the plane of the sprocket-wheel does not correspond exactly with the plane of travel of the sprocket-chain.

When a bicycle has been taken apart for the purpose of cleaning or adjustment, it frequently happens that the sprocket-wheel is not brought accurately into alinement with the plane of the travel of the sprocket-chain— that is to say, the plane of travel of the sprocket-chain may be slightly inclined to the plane of the sprocket-wheel, as shown by the dotted lines in Fig. 2.

In the use of a flanged sprocket-wheel, where the sprocket-chain runs onto the wheel at an angle, it is especially essential to provide some means to prevent the side links from running up onto the supporting-surfaces between the teeth. For example, as shown in Fig. 5, each side link of the chain as it passes under the bottom of the sprocket-wheel, as indicated at *a*, will be twisted so that it will tend to ride up onto the surface 13 between the teeth 12 of the sprocket-wheel, and as the chain straightens or changes its direction of travel while passing around the sprocket-wheel the side link will be finally crowded off of the surface 13. This action is objectionable, not only because it throws the rivets out of the pitch-line $pp$ of the sprocket-wheel, thus increasing the friction, but it is also exceedingly annoying, as it causes a continuous rattling or snapping of the chain.

To hold the side links of the chain away from the surfaces between the teeth of the sprocket-wheel, I narrow or undercut the bases of the sprocket-teeth.

Referring to the drawings and in detail, A designates a sprocket-chain, which may be of any of the ordinary or approved standard constructions. As illustrated, the sprocket-chain A comprises the blocks 10 and side links 11, riveted thereto in the ordinary manner.

The sprocket-wheel B is provided with extending sprocket-teeth 12, which are narrowed or undercut at their bases, as most clearly illustrated in Fig. 4, and has supporting-surfaces 13 between the teeth 12 for engaging the blocks 10 of the chain, and side flanges 14 for supporting the side links 11 of the chain.

In manufacturing sprocket-wheels constructed according to my invention a stamped-out steel blank is tapped out or threaded centrally, as at 15. The blank is then secured on an arbor or spindle, and two cutting-tools are preferably simultaneously moved axially with respect to the blank to shape the supporting-flanges 14 and an extending undercut rim for the teeth, the sprocket-wheel being completed by milling out the teeth in the ordinary manner.

In the use of a sprocket-wheel constructed according to my invention the blocks 10 of a sprocket-chain will rest upon and be supported by the working surfaces 13, and the side links 11 of the chain will rest upon and be supported by the flanges 14, while at the same time an ample working clearance will be maintained between the side links 11 and the supporting-surfaces 13, as illustrated in Fig. 3, so that the side links cannot possibly catch upon or run onto any one of the said supporting-surfaces 13.

I am aware that changes may be made in the construction of the sprocket-wheel by those who are skilled in the art without departing from the scope of my invention as expressed in the claims. I do not wish, therefore, to be limited to the form which I have shown and described; but What I do claim, and desire to secure by Letters Patent of the United States, is—

1. As an article of manufacture, a sprocket-wheel having supporting-surfaces for engaging the blocks of a sprocket-chain, flanges for engaging the side links of the chain, and extending teeth undercut at their bases, substantially as described.

2. As an article of manufacture, a sprocket-wheel having supporting-surfaces for engaging the blocks of a sprocket-chain, flanges of less diameter than said surfaces for engaging the side links of the chain, and extending teeth narrowed or undercut at their bases, so that the side links of the chain will be held away from the supporting-surfaces for engaging the blocks, substantially as described.

3. The combination of a sprocket-chain A comprising blocks 10 and side links 11, and a sprocket-wheel B having supporting-surfaces 13 for engaging the blocks 10, flanges 14 for engaging the side links 11, and extending teeth 12 narrowed or undercut at their bases to hold the side links away from the supporting-surfaces 13, substantially as described.

In testimony whereof I have hereunto set my hand in the presence of two subscribing witnesses.

ERNEST V. GAUTHIER.

Witnesses:
   LOUIS W. SOUTHGATE,
   PHILIP W. SOUTHGATE.